US005083408A

United States Patent [19]

Blom et al.

[11] Patent Number: 5,083,408

[45] Date of Patent: Jan. 28, 1992

[54] WOOD PRESERVATION METHOD AND PRESERVATION MEANS FOR USE IN SAID METHOD

[75] Inventors: Cornelis W. Blom, Sassenheim; Theodorus G. Vugts, Waalwijk, both of Netherlands

[73] Assignee: Window Care B.V., Netherlands

[21] Appl. No.: 472,574

[22] Filed: Jan. 30, 1990

[51] Int. Cl.[5] ....... A01N 9/02

[52] U.S. Cl. ....... 52/57; 428/537.5; 52/169.13

[58] Field of Search ....... 52/169.13, 189.14, 170, 52/514, 742, 727, 105; 428/34.2, 222, 537.5; 422/40; 493/269

[56] References Cited

U.S. PATENT DOCUMENTS

| | | | |
|---|---|---|---|
| 841,539 | 1/1907 | Kimsey | 493/269 |
| 1,565,503 | 12/1925 | Henderson | 422/40 X |
| 2,109,508 | 3/1938 | Schmittutz | 52/742 |
| 2,185,954 | 1/1940 | Ryner | 422/40 X |
| 2,979,377 | 4/1961 | Hitzman | 422/40 X |
| 3,133,321 | 5/1964 | Hine | 52/105 X |
| 3,321,924 | 5/1967 | Liddell | 52/170 X |
| 3,342,629 | 9/1967 | Martin | 422/40 X |
| 4,244,156 | 1/1981 | Watts, Jr. | 52/170 X |
| 4,389,446 | 6/1983 | Blom et al. | 422/40 X |
| 4,533,435 | 8/1985 | Intili | 428/537.5 X |
| 4,799,340 | 1/1989 | Lichau et al. | 52/170 |
| 4,921,555 | 5/1990 | Skiff | 52/169.13 X |

FOREIGN PATENT DOCUMENTS

| | | | |
|---|---|---|---|
| 118362 | 2/1968 | Norway | 52/727 |

*Primary Examiner*—Richard E. Chilcot, Jr.
*Assistant Examiner*—Wynn Wood
*Attorney, Agent, or Firm*—Larson and Taylor

[57] ABSTRACT

The invention relates to a wood preservation method comprising applying a tubular or rod shaped wood preservation device in a hole drilled in a wood construction to be preserved. The wood preservation device comprising a wrapping device of capillary, hygroscopic and when moistened, swellable material, such as paper, enclosing an active compound in the form of dry powder, a granulate or a paste or gel. The wood preservation device may comprise either a cylindrical tube of capillary, hygroscopic and when moistened, swellable material, such as paper, the tube containing active compound in the form of dry powder or a granulate. The wood preservation device may be in the form of a laminate coiled to form a rod-shaped or may be used as a flat laminate. The laminate may comprise the capillary, hygroscopic and when moistened, swellable material and a layer of active compound in the form of dry powder, a granulate, a paste or a gel.

16 Claims, 3 Drawing Sheets

WOOD PRESERVATION METHOD AND PRESERVATION MEANS FOR USE IN SAID METHOD

FIELD OF THE INVENTION

The invention relates to a wood preservation method comprising applying a wood preservation means in a hole drilled in a wood construction to be preserved. The invention also relates to an object containing said wood preservation means and to be placed substantially fittingly in a pre-drilled hole.

BACKGROUND OF THE INVENTION

One of the earliest in situ remedial wood treatment techniques for existing window frames comprised injection of wood preservation liquid containing 99% solvent and only 1% active compound into existing wood constructions such as window and door frames. This technique has the disadvantage of being hardly controllable and having a dubious effect.

The next method known as Woodcap comprised drilling holes and placing therein glass ampoules filled with liquid containing 95% solvent and 5% active compound and closed with a cap. By hammering or screwing the cap of the ampoule into a hole, the ampoule breaks and the contents spread.

Because this wet system suffered from leakages which are unacceptable from an environmental point of view there was a need for a dry system of wood preservation.

One known technique comprised the use of hydrophilic polymers that are able to dispense certain active compounds in a controllable manner. Such compounds have been used in predrilled holes as in the disclosed wet system.

Attempts to mould the said hydrophilic polymers into objects which can be safely handled have failed and instead a polyvinyl alcohol wrapping has been used containing a combination of the dry substance bifluoride and a hydrophilic polymer. In practice this method of wood preservation has five disadvantages. First, it needed 45% hydrophilic substance so that there was only place for 55% active compound. Second, leakage at the closing cap releases large amounts of concentrated active compound which attack paint coats. Third, it takes a long time for the active compound to dissolve. Fourth, the active compound is not homogeneously spread, and fifth, because residues of the polyvinyl alcohol accumulate in the surrounding wood the intrusion of active compound into the wood is impeded.

A more recent technique comprises the use of the active compound in the form of solid rods to be placed in pre-drilled holes.

The subject invention is based on the insight that the existing rods can be improved as far as the following aspects are concerned.

1) In order to have sufficient strength the rods need a certain minimum diameter. Because of this they are often too large for narrow window frames, which would be weakened by drilling large diameter holes therein.

2) The rods need to contain at least 45% aggregate for them to be moulded in rod form.

3) After press moulding the rods are not capillary which has an adverse effect on the dissipation of the compound into the surrounding wood.

4) For installing the rods they must be handled manually so that contact of active compound with the skin is difficult to avoid.

SUMMARY OF THE INVENTION

In a first embodiment of the invention the wood preservation means comprises a cylindrical tube of capillary, hygroscopic and when moistened, swellable material, such as paper, said tube containing active compound in the form of dry powder or a granulate.

Active compounds are for example substances that are toxic to wood-attacking micro-organisms and/or insects, including metal compounds, such as tributyl Lin oxyde, salts of copper, chromium, arsenic, boron-containing compounds, organic pesticides, such as pentachlorophenol, lindane, DDT, etc. The wood preservative according to the invention preferably contains one or more of the compounds $KHF_2$, $NaHF_2$ and $NH_4HF_2$, which are preferred by reason of their high activity and slight environmental effects.

Advantageous effects of the wood preservation means in this embodiment of the invention are:

a) the object is closed so that it can be held in the hand without any objections;

b) surface activity throughout the entire surface area;

c) the use of paper as wrapping material provides for the desirable water attracting and swelling properties;

d) no cap is neccessary: the drilled hole can be sealed with filler material;

e) the wood preservation means is applicable in the preventive treatment of new constructions because the wood preservation rod means can be put into place from the inside before a joint is closed;

f) since the functioning of the preservation means fully relies on capillarity, high concentrations of active compound can be used;

g) the method is flexible as far as the dimensions of the wood structures are concerned;

h) in use the specific rod shaped wood preservation means of the invention becomes active only when conditions arise in which fungus starts to develop, i.e. when the environment of the rod reaches a high degree of humidity. Only if and when this situation exists (85% relative humidity) does the wrapping attract moisture, swell and set itself firmly and fittingly against the wall of the hole. The powder filling that can contain 98% active compound, also attracts water, dissolves and diffuses into the surrounding wood through capillary action.

Tubular paper casing wood preservation rods present some problems. The manufacture thereof is highly labour consuming. Open ended small tubes can be manufactured automatically at high rates without any problem. However, no apparatus is available for filling these tubes and closing both ends with caps. Developing such an apparatus is prohibitively expensive. Further in use the tubular wrappings are available in a limited number of lengths and diameters.

The problems referred to are solved according to the invention by replacing the tubular casing with dry filling of active compound by a coiled up laminate of paper and the active compound. This can be made in several manners;

(I) In one method a rectangular sheet is used on which a layer of glue is applied. Active compound is sprinkled onto the glue layer. Next the sheet with the active compound thereon is folded, either doubled or with two edges folded towards the middle and the doubled laminate is coiled up to form a rod shaped wood preservation means. This embodiment has the following advantages: (1) the active compound is distributed over the entire coil length, unlike a tube partly filled with granular compound, (2) that by coiling a small central passage remains open through which the active compound can be activated when neccessary for pest control in dry conditions, and (3) the coil is easy to manufacture in small diameters. This last is important because a small diameter permits distributing a plurality of preservation means over an area of a small sized window frame. On the other hand very thick coils can be manufactured for use in utility poles.

(II) In another method according to the invention, there is used a rectangular sheet of paper having a edge flap over at least part of its circumference. The manufacturing steps are the same as in the previous embodiment except that after the active compound has been sprinkled onto the glue layer the edge flaps are folded over the sheet and the so formed laminate with covered edges is coiled up to form a rod shaped wood preservation means. This embodiment has the same advantages as the previous one and further that the compound is fully enclosed.

(III) A third embodiment differs form the previous ones (I and II) in that active compound is used in the form of a paste or gel that is extruded onto the paper sheet instead of a powder or a granulate, that is sprinkled onto the paper sheet.

(IV) In a fourth embodiment, after manufacture of the laminate by any of the methods described under I–III above, the laminate is not coiled up but is used as a flat plaster or bandage for protecting wood surfaces. This embodiment is very useful for the protection of utility poles.

The wood preservation means of the invention in the coiled embodiments have further advantages.

First of all a uniform distribution of the active compound takes place automaticall over the entire length of the rod and this the distribution remains constant a long time due to the fact that active compound is dissolved from consecutive layers in the coil. Another advantage of the coiled embodiment is that rods can be manufactured in different lengths by simply cutting of the desired lengths. An important advantage is that the active compound remains in place within the coil until it dissolves.

Commonly utility pole protection is based on wood preservation either from the outside by using fungicidally active bandages or from the inside by means of large glass ampoules containing large amounts of high concentrated toxic compounds. Such bandages and ampoules are positioned in the air/soil transition area of a pole.

According to the invention dry wood preservation means are placed in the air/soil transition area of utility poles and additionally a watertight UV-blocking protection can be applied using a bandage as disclosed in embodiment (IV).

The method according to the invention provides a three fold protection, viz. against fungus or insects, against water intrusion and against UV-rays. The method is less expensive than the traditional methods and is more friendly to the environment.

BRIEF DESCRIPTION OF THE DRAWINGS

Some embodiments of the invention will now be described with reference to the accompanying drawing, in which.

DETAILED DESCRIPTION OF THE PREFERRED EMBODIMENTS

Figure 1:
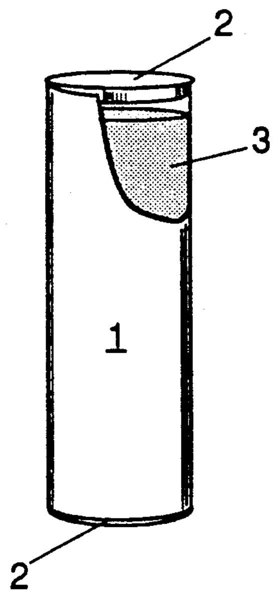
FIG. 1 is a side elevational view, partly in section of a tubular wood preservation means comprising a paper casing and a dry filling of active compound.

The tubular embodiment of the wood preservation means shown in FIG. 1 comprises a tubular wrapping or housing 1 of capillary, hygroscopic and when moistened, swellable material, such as paper. The wrapping 1 is closed with two end caps 2 and is filled with active compound in the form of dry powder or a granulate indicated at 3.

Figure 2:
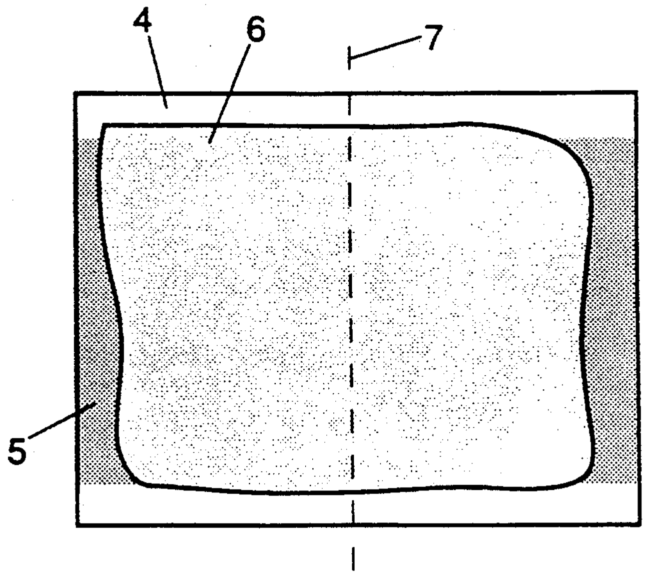
FIGS. 2, 2A and 2B show consecutive stages of manufacture of a coiled rod shaped wood preservation means.
Figure 2A:
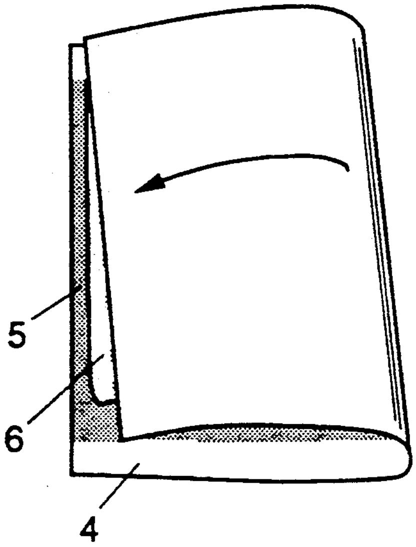
Figure 2B:
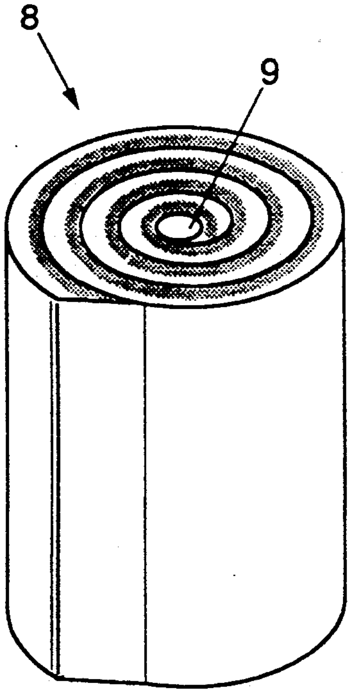

FIG. 2 shows a rectangular paper blank 4 having a layer of glue 5 applied thereto and a layer of active compound powder or granulate 6 sprinkled onto the glue layer 5. A fold line 7 is indicated. As shown in FIG. 2A the laminate of paper 4, glue layer 5 and powder layer 6 is folded over the fold line 7. Next the doubled laminate is coiled as shown in FIG. 2B to form a coiled wood preservation rod 8. In the centre of the rod 8 is a passage 9 which can be used for injecting water when the preservation means is to be activated in dry condition.

Figure 3:
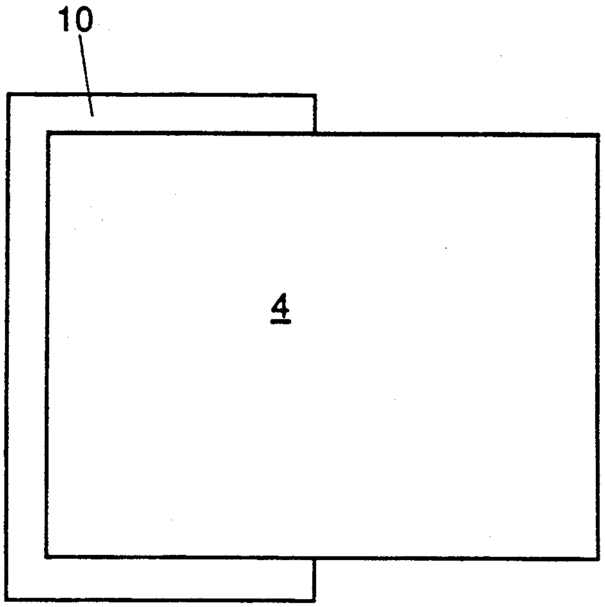
FIG. 3 is a top view of a blank for manufacturing another embodiment of a coiled embodiment.
Figure 3A:
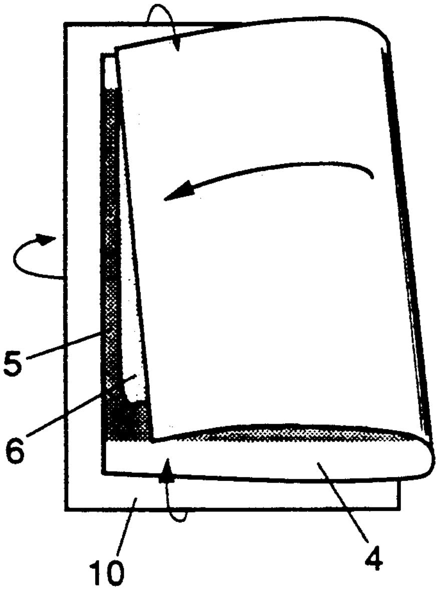

FIG. 3 shows a variant of the blank 4 in FIG. 2. The paper sheet 4 in FIG. 3 is provided with edge flaps 10 that, as shown in FIG. 3A, are folded over the doubled laminate to enclose the active compound 6 as an envelope.

Figure 4A:
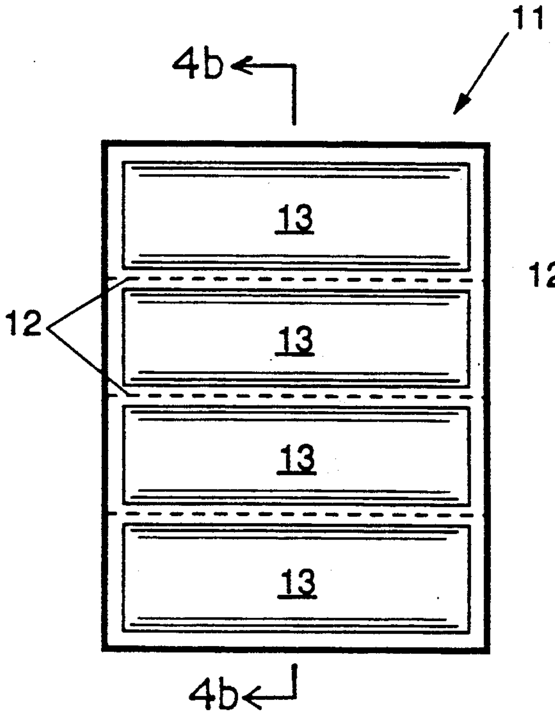
FIG. 4*a* is a top view of a flat laminated wood preservation means and FIG. 4*b* is a cross-sectional view thereof taken along the section line 4*b*-4*b*.
Figure 4B:
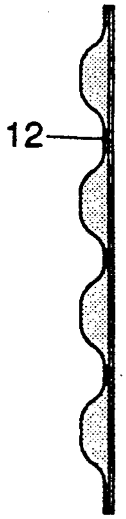

FIG. 4 shows a flat wood preservation means 11 made according to the manufacturing steps shown in FIGS. 2 and 2A. Instead of coiling the so prepared laminate, a number of separation lines 12 are made for dividing the laminate into strips 13 that can be torn off for separate use, for example as shown in FIG. 6.

Figure 6:
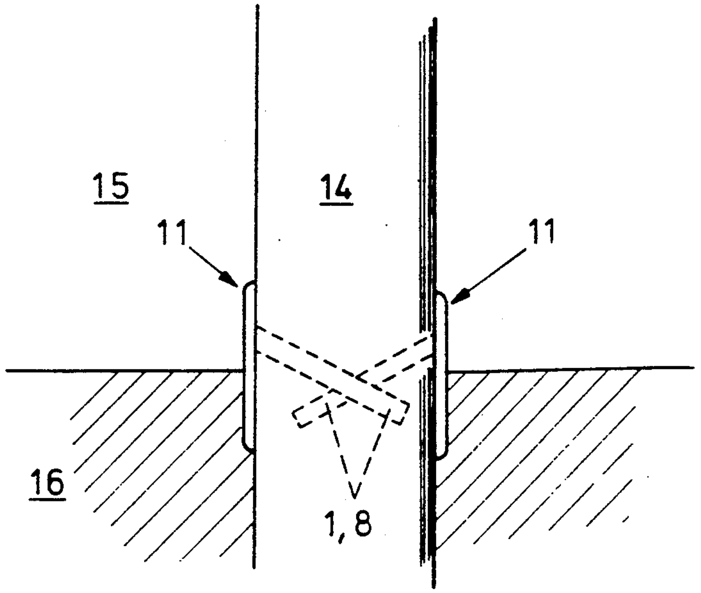
FIG. 6 shows a detail of a utility pole with wood preservation means of the invention in the air/soil transition area.

FIG. 6 shows a detail of a wooden utility pole 14 in the air 15 / soil 16 transition area. Large size rod shaped wood preservation means 1 or 8 are mounted in predrilled holes and the area is protected from water intrusion and UV rays by a bandage made for example of flat wood protection means 11 or 13 as shown in FIG. 4.

Figure 5:
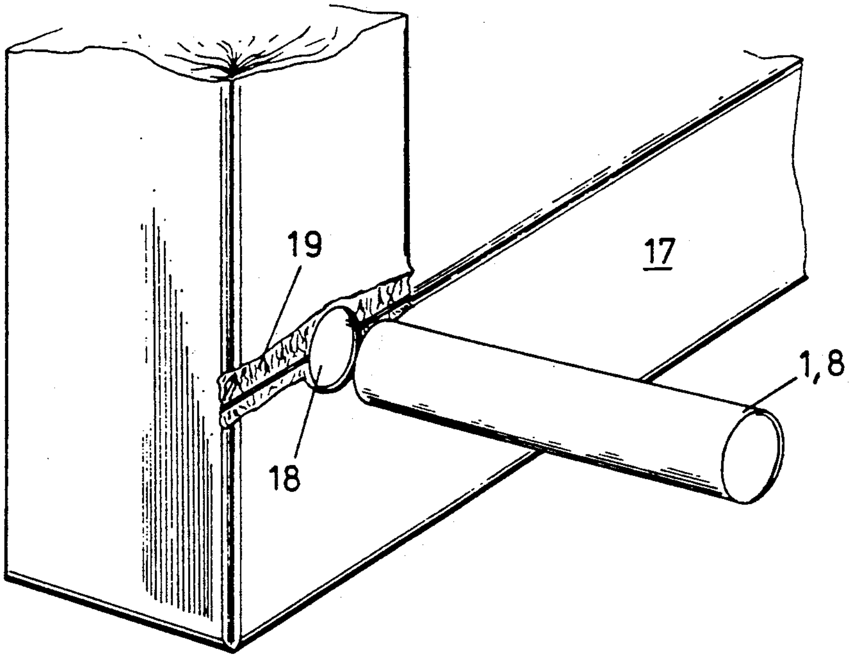
FIG. 5 show the application of a rod shaped wood preservation means in a window frame.

FIG. 5 shows a detail of a window frame 17 having a hole 18 drilled in a joint 19. A tubular wood preservation means 1 is shown for insertion in the hole 18. Instead of a tubular means coiled rod shaped means 8 may be used.

We claim:

1. A method of wood preservation comprising the steps of:

drilling a hole in a wood construction to be preserved; and applying in the hole a tubular wood preservation means comprising a wrapping means which is capillary, hygroscopic, and swellable when moistened and an active compound in the form of a particulate, a paste or a gel enclosed in the wrapping means whereby spreading of the active compound occurs only when the wood is sufficiently wet and the wrapping means swells so that the active compound then diffuses through the wrapping means.

2. A method of manufacturing a tubular wood preservation means which is applied in a hole drilled in a wood construction to be preserved and which comprises a wrapping means which is capillary, hygroscopic, and swellable when moistened and an active compound in the form of a particulate enclosed in the wrapping means whereby spreading of the active compound occurs only when the wood is sufficiently wet and the wrapping means swells so that the active compound then diffuses through the wrapping means, said method comprising the steps of:

applying an adhesive to a rectangular sheet which subsequently forms the wrapping means;

sprinkling the particulate onto the adhesive;

folding the sheet with the particulate thereon to form a laminate; and coiling the laminate to form the tubular wood preservation means.

3. A method of manufacturing a tubular wood preservation means as claimed in claim 2 wherein said folding step includes the double folding of the sheet.

4. A method of manufacturing a tubular wood preservation means as claimed in claim 2 wherein said folding step includes the folding of two edges of the sheet toward a middle of the sheet.

5. A method of manufacturing a tubular wood preservation means as claimed in claim 2 wherein the sheet includes an edge flap over at least part of a periphery thereof, and wherein said folding step includes the folding of the edge flap over a remaining portion of the sheet.

6. A method of manufacturing a tubular wood preservation means which is placed in a hole drilled in a wood construction to be preserved and which comprises a wrapping means which is capillary, hygroscopic, and swellable when moistened and an active compound in the form of a paste or gel enclosed in the wrapping means whereby spreading of the active compound occurs only when the wood is sufficiently wet and the wrapping means swells so that the active compound then diffuses through the wrapping means, said method comprising the steps of:

extruding the active compound onto a rectangular sheet including an edge flap over at least part of a periphery thereof which sheet subsequently forms the wrapping means;

folding of the edge flap over a remaining portion of the sheet to form a laminate; and coiling the laminate to form the tubular wood preservation means.

7. A method of wood preservation comprising the step of:

applying onto a wood construction to be preserved a flat wood preservation means comprising a wrapping means which is capillary, hygroscopic, and swellable when moistened and an active compound in the form of a paste or gel enclosed in the wrapping means whereby spreading of the active compound occurs only when the wood is sufficiently wet and the wrapping means swells so that the active compound then diffuses through the wrapping means.

8. A method of manufacturing a flat wood preservation means which is applied onto a wood construction to be preserved and which comprises a wrapping means which is capillary, hygroscopic, and swellable when moistened and an active compound in the form of a paste or gel enclosed in the wrapping means whereby spreading of the active compound occurs only when the wood is sufficiently wet and the wrapping means swells so that the active compound then diffuses through the wrapping means, said method comprising the steps of:

extruding the active compound onto a rectangular sheet including a fold panel and fold edges which sheet subsequently forms the wrapping means;

folding of the fold panel over the rectangular sheet; and folding the fold edges over a remaining portion of the sheet to form a flat wood preservation laminate.

9. A method of manufacturing a flat wood preservation means as claimed in claim 8 and further including the step of dividing the flat wood preservation laminate into separable strips such that each strip is usable separately.

10. A wood preservation means which is positioned in a wood to be preserved comprising:

a cylindrical tube which is capillary, hygroscopic, and swellable when moistened; and an active compound in the form of a particulate which is enclosed in said tube whereby spreading of said active compound occurs only when the wood is sufficiently wet and said tube swells so that the active compound then diffuses through said tube.

11. A coiled laminate wood preservation means which is positioned in a wood to be preserved comprising:

a coiled material which is capillary, hygroscopic, and swellable when moistened; and a layer of an active compound in the form of a particulate, a paste, or a gel which is applied on said material before said material is coiled whereby spreading of said active compound occurs only when the wood is sufficiently wet and said material swells so that the active compound then diffuses through said material.

12. A flat laminate wood preservation means which is positioned on a wood to be preserved comprising:

a wrapping material which is capillary, hygroscopic, and swellable when moistened; and a layer of an active compound in the form of a paste or a gel which is contained in said wrapping material whereby spreading of said active compound occurs only when the wood is sufficiently wet and said material swells so that the active compound then diffuses through said material.

13. A flat laminate wood preservation means as claimed in claim 12 and further including separation lines by which said wrapping material is divisible into discrete strips containing portions of said active compound.

14. A method of preserving wooden utility poles comprising the steps of:

drilling a hole at an air/soil transition area of the pole;

placing in the hole a wood preservation means comprising a cylindrical tube which is capillary, hygroscopic, and swellable when moistened and an active compound in the form of a particulate which is enclosed in said tube whereby spreading of said active compound occurs only when the wood is sufficiently wet and said tube swells so that the active compound then diffuses through said tube; and protecting the wood preservation means in the hole by covering the hole with a bandage.

15. A method of preserving wooden utility poles comprising the steps of:

placing on the pole at an air/soil transition area thereof a flat wood preservation means comprising a wrapping material which is capillary, hygroscopic, and swellable when moistened and a layer of an active compound in the form of a paste or a gel which is contained in said wrapping material whereby spreading of said active compound occurs only when the wood is sufficiently wet and said material swells so that the active compound then diffuses through said material; and protecting the wood preservation means on the pole by covering the wood preservation with a bandage.

16. A wood preservation means which contacts a wood to be preserved comprising:

a material which is capillary, hygroscopic, and swellable when moistened; and an active compound in the form of a particulate, a paste or a gel whereby spreading of said active compound occurs only when the wood is sufficiently wet and said material swells so that the active compound then diffuses through said material.

* * * * *